US011940788B1

(12) United States Patent
Carollo et al.

(10) Patent No.: US 11,940,788 B1
(45) Date of Patent: Mar. 26, 2024

(54) SYSTEM AND METHOD OF RF SPEED CONTROL FOR HIGH-PERFORMANCE VEHICLES

(71) Applicant: WOW Technologies LLC, Shelby Township, MI (US)

(72) Inventors: Robert Carollo, Shelby Township, MI (US); Catherine Kirk, Clinton Township, MI (US); Timothy P. Lyon, Dearborn, MI (US)

(73) Assignee: WOW Technologies LLC, Shelby Township, MI (US)

( * ) Notice: Subject to any disclaimer, the term of this patent is extended or adjusted under 35 U.S.C. 154(b) by 0 days.

(21) Appl. No.: 17/972,342

(22) Filed: Oct. 24, 2022

(51) Int. Cl.
*G05D 1/00* (2006.01)
*B60W 10/08* (2006.01)
*B60W 40/105* (2012.01)

(52) U.S. Cl.
CPC ........... *G05D 1/0022* (2013.01); *B60W 10/08* (2013.01); *B60W 40/105* (2013.01); *B60W 2556/65* (2020.02); *G05D 2201/0213* (2013.01)

(58) Field of Classification Search
CPC ........ G05D 1/0022; G05D 2201/0213; B60W 10/08; B60W 40/105; B60W 2556/65
See application file for complete search history.

(56) References Cited

U.S. PATENT DOCUMENTS 4,619,231 A 10/1986 Stolar et al.
5,861,799 A 1/1999 Szwed
6,072,248 A 6/2000 Muise et al.
6,232,884 B1 5/2001 Gabbard
6,411,887 B1 6/2002 Martens et al.
6,504,472 B2 1/2003 Machala et al.
6,505,101 B1 1/2003 Brill
6,611,201 B1 8/2003 Bishop et al.
(Continued)

FOREIGN PATENT DOCUMENTS

DE 102006032766 A1 * 1/2008 ........... B60K 31/047
GB 2507249 A 4/2014
WO 98/30421 A1 7/1998

OTHER PUBLICATIONS

English Translation of DE-102006032766-A1.*

*Primary Examiner* — Rami Khatib
*Assistant Examiner* — Shahira Baajour
(74) *Attorney, Agent, or Firm* — Howard & Howard Attorneys PLLC

(57) ABSTRACT

A system and method includes a wireless receiver and/or receiver-transceiver integrated into one of a powertrain electrical system, ECU, MCU, and vehicle speed output sensors of the high-performance vehicle, a speed command control device integrated into the wireless receiver and/or receiver-transceiver to automatically turn ON at a predetermined vehicle speed, and a transmitter and/or transmitter-transceiver operable by law enforcement to transmit RF messaging packets to the wireless receiver and/or receiver-transceiver when the speed command control device is activated by the transmitter and/or transmitter-transceiver to reduce the speed of the high-performance vehicle. The method may implement Vehicle Speed Ship Mode (VSSM) with the same, similar, or different RF receiver and/or receiver-transceiver by turning ON the speed bit indefinitely by use of custom factory software and or factory tool.

18 Claims, 4 Drawing Sheets

13
10
12

(56) References Cited

U.S. PATENT DOCUMENTS 6,707,392 B1 3/2004 Melton
6,873,246 B1 3/2005 Ligoci, Sr. et al.
6,897,763 B2 5/2005 Howells
7,246,439 B2 7/2007 Rau et al.
7,305,294 B2 12/2007 Bate et al.
8,070,172 B1 * 12/2011 Smith ...................... B62K 5/05 280/124.135
8,239,076 B2 8/2012 McGarry et al.
8,587,435 B2 11/2013 Nguyen
8,781,647 B2 7/2014 Durkin et al.
10,857,973 B2 12/2020 Kicinski et al.
11,161,475 B2 11/2021 Abiakle Kai et al.
2005/0082913 A1 4/2005 Nomura
2005/0195069 A1 9/2005 Dunand
2006/0250272 A1 11/2006 Paumau
2007/0046490 A1 3/2007 Booth
2007/0288127 A1 12/2007 Haq et al.
2008/0015744 A1 1/2008 Lund
2008/0243350 A1 10/2008 Harkness
2010/0100327 A1 * 4/2010 Jensen .................. G01K 1/024 340/539.3
2010/0210301 A1 * 8/2010 Dietz ................ H04W 52/0254 340/670
2011/0015809 A1 * 1/2011 Hermann ................ H04Q 9/00 701/1
2018/0291575 A1 10/2018 Roe, Jr. et al.
2021/0256787 A1 8/2021 Golden
2021/0356955 A1 11/2021 Nsimba-Dikwama

* cited by examiner

SYSTEM AND METHOD OF RF SPEED CONTROL FOR HIGH-PERFORMANCE VEHICLES

BACKGROUND OF THE INVENTION

1. Field of the Invention

The present invention relates generally to all motor vehicles including high performance (horsepower to weight ratio), electric vehicles (EV) with high torque and acceleration, hybrid vehicles, motorcycles, and newly manufactured vehicles while being shipped that have an allowable maximum speed limited known as Vehicle Speed Ship Mode (VSSM) prior to being sold. In addition, the present invention is compatible with Vehicle Cyber Security if required.

2. Description of the Related Art

In today's evolving and very competitive automotive manufacturing world, automotive manufactures seek out new ways to attract new and exciting buyers, both young and old. One of the types of vehicles the manufacturers have decided to design and build with great success is low cost and high cost "high-performance vehicles" capable of rapid acceleration and/or exceeding 100+ MPH. These vehicles can be purchased or leased by an operator without any real driving experience, training, or sense of responsibility. The lack of any of these disciplines, often results in an operator of the vehicle driving at very high speeds, resulting in frequent accidents, injuries, and loss of life and property. Currently, law enforcement has limited means in catching the vehicle and/or driver due to the excessive high speeds.

Today, rouge high-speed vehicle drivers are less likely to receive a speeding ticket due to the excessive vehicle speeds, as law enforcement does not have a readily available means to catch and arrest these rouge drivers. This is primarily due to not having a safe reliable way to arrest and charge these irresponsible drivers. Law enforcement has been directed not to engage with high-speed drivers due to the risk associated with a high-speed chase resulting now in multiple vehicles engaged in very high speeds, possibly resulting in loss of life of innocent drivers.

To combat these drivers, systems have been developed applicable to various internal combustion engines and high torque electric motors such as for automobiles, to permit an authorized person, such as a police officer, to prevent their improper or illegal operation.

Accordingly, it is desirable to provide a system and method for speed control of a high-performance vehicle. It is also desirable to provide a system and method for speed control for high-performance vehicles including motor vehicles, electric vehicles (EV), and motorcycles. Therefore, there is a need in the art to provide a system and method for using individual human law enforcement RF speed control for a high-performance vehicle.

SUMMARY OF THE INVENTION

Accordingly, the present invention provides a system of RF speed control for a high-performance vehicle including a wireless receiver and/or receiver-transceiver integrated into one of a powertrain electrical system, ECU, MCU, and vehicle speed output sensors of the high acceleration and/or high-performance vehicle, a speed command control device integrated into the wireless receiver and/or receiver-transceiver to automatically turn ON the wireless receiver and/or receiver-transceiver at a predetermined vehicle speed, and at least one of a transmitter-transceiver operable by law enforcement to transmit RF messaging packets to the wireless receiver and/or receiver-transceiver when the speed command control device is activated by the transmitter-transceiver being activated to reduce the speed of the high-performance vehicle.

The present invention also provides a method of RF speed control of a high-performance vehicle including steps of providing a wireless receiver and/or receiver-transceiver integrated into one of a powertrain electrical system, ECU, MCU, and vehicle speed output sensors of the high-performance vehicle, automatically turning ON, by a vehicle speed command control device integrated, internally and/or externally into the wireless receiver and/or receiver-transceiver, the wireless receiver/transceiver at a predetermined vehicle speed, and transmitting, by a transmitter-transceiver of law enforcement, RF messaging packets to the wireless receiver and/or receiver-transceiver when the speed command control device is activated by the transmitter-transceiver and reducing the speed of the high-performance vehicle.

In the present invention, upon an unusually high vehicle speed being reached, the receiver and/or receiver-transceiver is enabled for a preset period of time. During this preset period, the engine and/or motor can be disabled and/or speed reduction by a transmission from the transmitter-transceiver operated by law enforcement, preferably a police officer using a designated exclusive channel, frequency, and data packets not easily copied by any outside parties.

It will be seen therefore that the receiver and/or receiver-transceiver is only available to receive a signal from the transmitter-transceiver in the event that the vehicle engine and/or vehicle motor has reached a speed or high torque range considered dangerous primarily from a vehicle stop, i.e. rapid acceleration and/or over 100 MPH, which is a very high speed for normal operation whether powered by an internal combustion engine (gas) or a powered by electric motors of an Electric Vehicle (EV), indicating that some unusual activity is taking place, such as the driver attempting to speed excessively, or accelerating dangerously as would be occasioned by an attempt to evade arrest and or acting irresponsible. Once the internal set vehicle speed and or rapid acceleration control signal is received and the receiver/transceiver is activated, it remains in this operative condition for the time delay period set by the control element of the time delay such as a solid-state electronic timer or any preferred method by the vehicle manufacturer. Quick cessation of the unusual activity will restore the receiver/transceiver to the inoperative state after the time delay period after speed and/or torque is reduced, unless the activity is resumed.

If a signal is received from the transmitter-transceiver while the receiver and/or receiver-transceiver is in this condition, the output of the receiver and/or receiver-transceiver causes operation of a relay or solid-state electronic timer, whereupon contacts close, or a solid-state electronic timer closes, and an optional indicator lamp may be lit and/or warning chime, warning the driver of excessive speed that the vehicle's speed receiver is armed or any other device method preferred by the vehicle manufacturer and or any laws governing over vehicle manufacturing or transportation. All power assist mechanisms of the vehicle, such as the power brakes and power steering, and all safety vehicle systems will continue to function normally, so that the operation of the brakes and steering remains normally controllable, thus not endangering vehicle occupants. During a Law enforcement RF transmission to a speeding vehicle, all power assist mechanisms of the vehicle, such as the power brakes, power steering, and all safety systems will continue to function normally, so that the operation of the brakes and steering remains normally controllable, thus not endangering the vehicle occupants.

One advantage of the present invention is that a system and method of RF speed control is provided for a high-performance vehicle whether internal combustion and/or electric. Another advantage of the present invention is that the system and method reduce high-speed irresponsible rouge driving of high-performance vehicles. Yet another advantage of the present invention is that the system and method enable law enforcement not to have to engage in high-speed chases. Still another advantage of the present invention is that the system and method enable law enforcement to no longer have to engage with the driver alongside the road, making it dangerous for both parties. A further advantage of the present invention is that the system and method enable law enforcement to less likely encounter a hostile driver situation. Yet a further advantage of the present invention is that the system and method generate the receipt of funds from speeding tickets. Still a further advantage of the present invention is that the system and method result in less property damage, resulting in less insurance payouts.

These and other objects, advantages, and features of the present invention will become better understood from the following detailed description of one exemplary embodiment of the present invention that is described in conjunction with the accompanying drawings.

DESCRIPTION OF THE PREFERRED EMBODIMENT(S)

Figure 1:
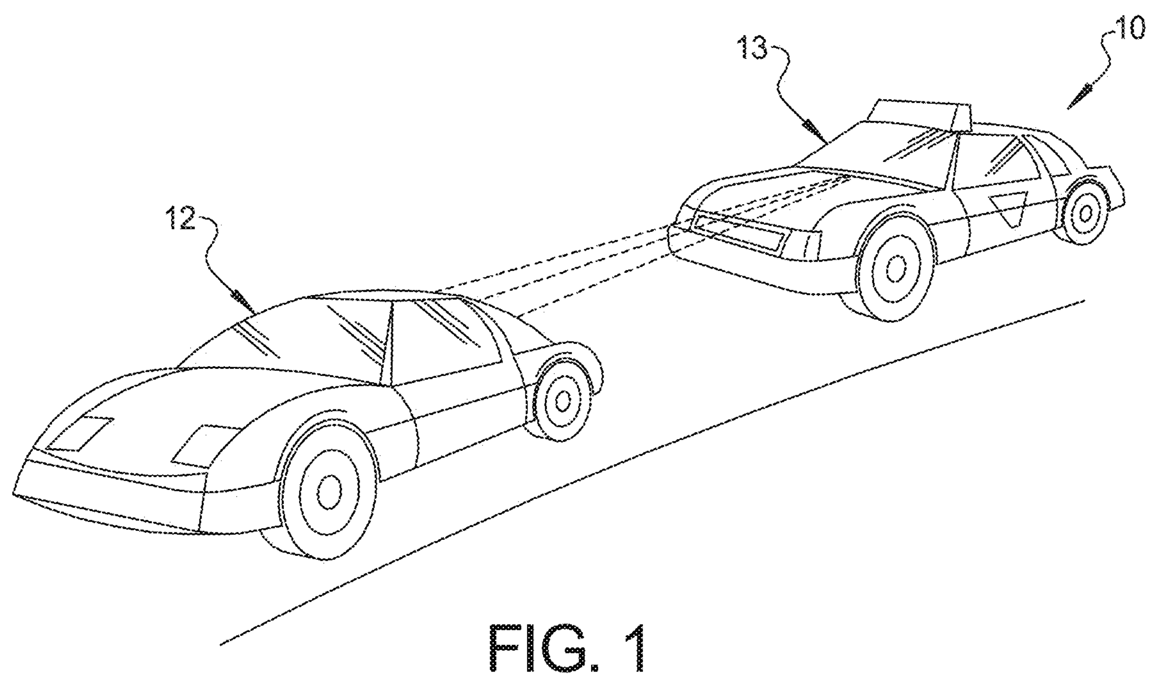
FIG. 1 is a diagrammatic view of a system, in accordance with one embodiment of the present invention, for RF speed control of a high-performance vehicle.
Figure 2:
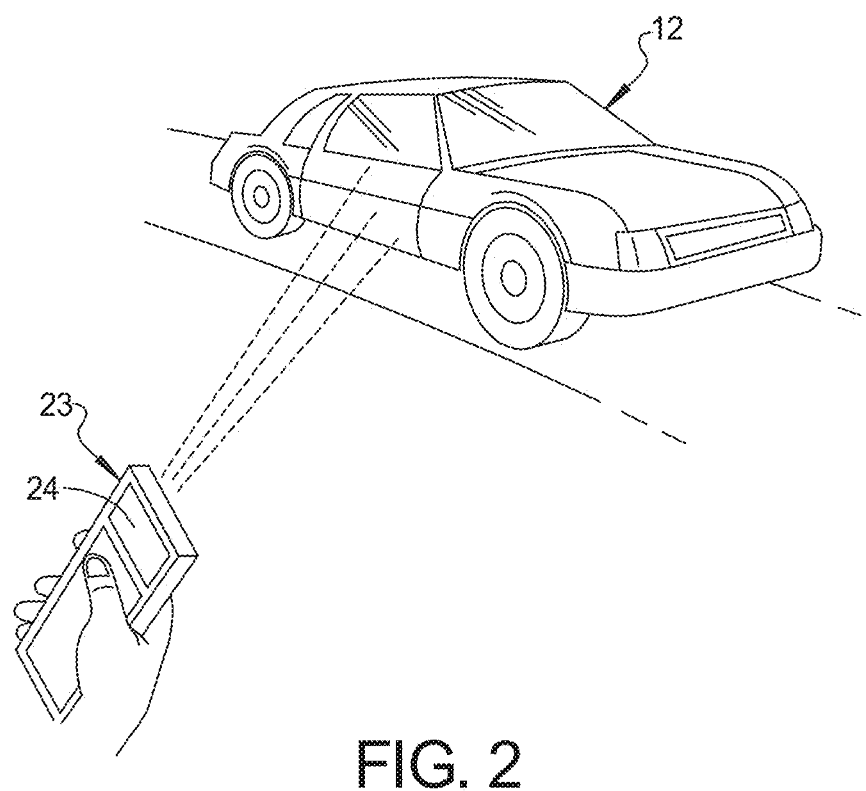
FIG. 2 is a diagrammatic view of a handheld transmitter of the system of FIG. 1 transmitting messaging packets to the high-performance vehicle in accordance with an embodiment of the present invention.
Figure 3:
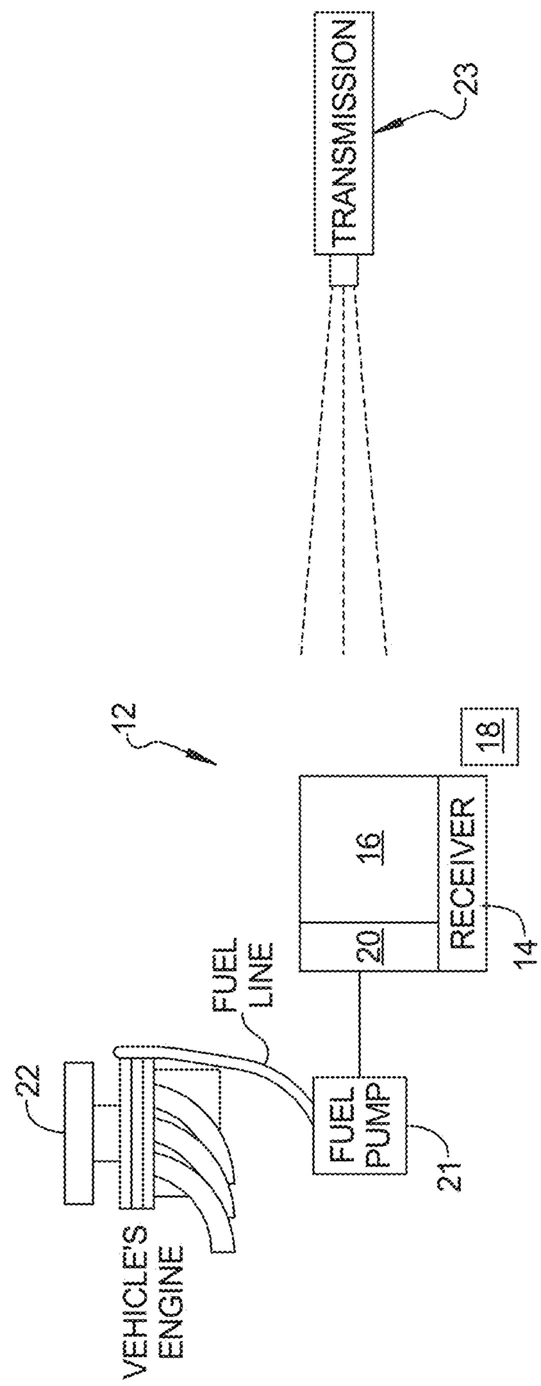
FIG. 3 is a diagrammatic view of an internal components of the high-performance vehicle receiving the messaging packets transmitted by the transmitter of FIG. 2 in accordance with an embodiment of the present invention.
Figure 5:
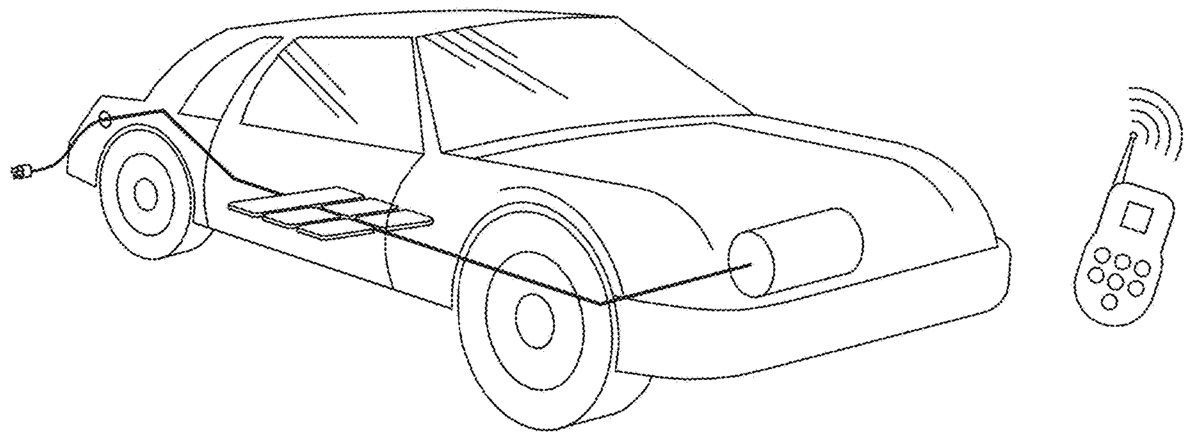
FIG. 5 is a diagrammatic view of RF speed control of an electric vehicle (EV) in accordance with an embodiment of the present invention.
Figure 6:
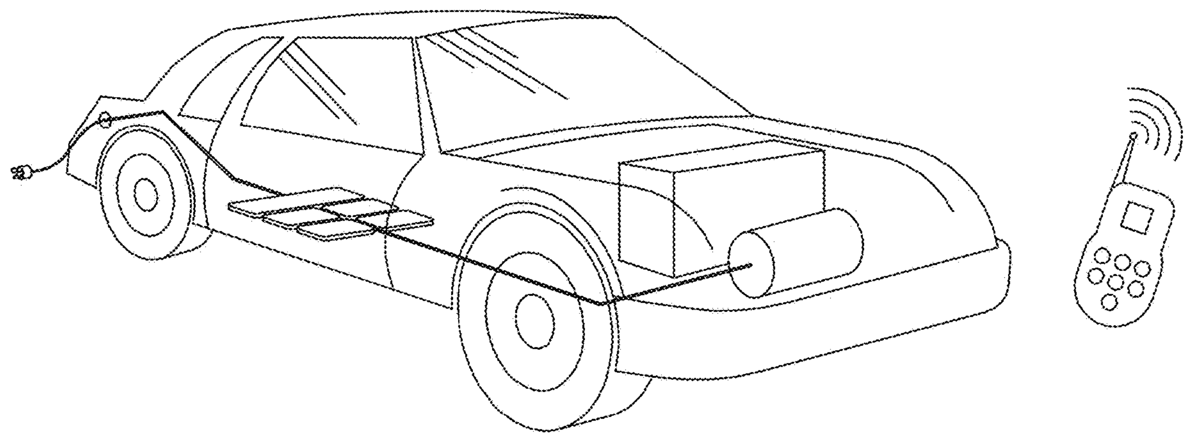
FIG. 6 is a diagrammatic view of RF speed control of a hybrid vehicle in accordance with an embodiment of the present invention.
Figure 7:
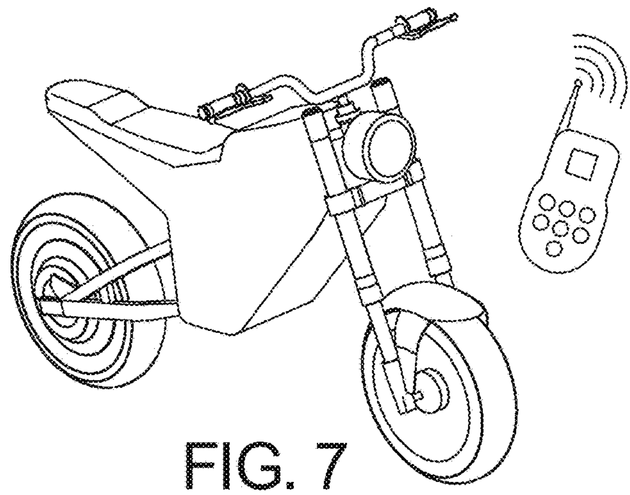
FIG. 7 is a diagrammatic view of RF speed control of a motorcycle in accordance with an embodiment of the present invention.

Referring to the drawings, and in particular FIGS. 1-3, a diagrammatic view illustrating one embodiment of a RF speed control system 10, according to the present invention, is shown for a high-performance vehicle, generally indicated at 12, passing by a law enforcement vehicle, generally indicated at 13. The high-performance vehicle 12 is grouped in a class of horsepower to weight ratio, which equals MPH, vehicles. The RF speed control system 10 includes a wireless receiver and/or receiver transceiver 14 having an antenna (not shown) integrated into an electrical system 16 of the high-performance vehicle 12 which is receives an input from a vehicle speed output sensor 18. It should be appreciated that the RF speed control system 10 may include the vehicle speed output sensor 18 and/or all sensors that monitor speed including throttle position sensors including engine control unit (ECU) or motor control unit (MCU), which is typically equipped in all regular production and high-performance vehicles 12. It should also be appreciated that the RF speed control system 10 may be applied to an electric vehicle (EV) of FIG. 5, a hybrid vehicle of FIG. 6, and a motorcycle of FIG. 7.

In one embodiment, the wireless receiver and/or receiver-transceiver 14 is an RF speed receiver and the electrical system 16 is a powertrain electrical system of the regular or high-performance vehicle 12. The RF speed control system 10 includes a speed command control device 20 such as a speed bit/flag that controls the wireless receiver 14. In one embodiment, the speed command control device 20 is calibratable by the supplier and/or manufacturer and controls the wireless receiver 14 by the speed command control device 20 being turned ON at a predetermined speed of the high-performance vehicle 12. In one embodiment, the wireless receiver 14 is integrated into the powertrain (ECU) electrical system and/or motor control unit (MCU). It should be appreciated that the wireless receiver 14 is tamper proof. It should be appreciated that the wireless receiver 14 and electrical system 16 are part of a vehicle run system to prevent shielding and/or any type of tampering.

The wireless receiver 14 controls one or more of the speed outputs to provide the reduced speeds of the high-performance vehicle 12. The speed reduction outputs can be a single and/or multiple vehicle output functions at a given time so as to protect other vehicle components when any of the following is changed to reduce vehicle speed: ignition spark timing; fuel flow into the engine cylinders by way of fuel injectors (dwell timing); fuel pump 21 regulated fuel rail pressure to fuel injectors 22; air restriction (restricting the amount of air entering the engine); throttle position sensor; variable valve timing; engine revolutions per minute (RPM); transmission output speed sensors, transmission input and output sensors for speed, transmission gear selection, governing speed (limp-in mode, locked in a low gear of the transmission); ABS wheel speed sensors. For electric vehicles (EV), the RF receiver can be turned ON by torque acceleration and or G-force sensors and or vehicle speed sensor(s) and or accelerator pedal position sensor and or battery voltage sensor and or motor voltage sensor and or battery amperage sensor and or motor amperage sensor and or pulse width modulation, frequency modulation, amplitude modulation, phase modulation, or any sensor outputs and inputs that are similar to the internal combustion engine as previously described. Power is converted from the DC battery to AC motor(s) driven vehicles including DC motors. The accelerator pedal sends a signal to the motor control unit (MCU) which adjusts the vehicle's speed by changing the frequency of the AC power from the inverter to the motor(s). The motor connects and turns the wheels through a cog/coupling. The motor control unit (MCU) and output sensors that are tied to acceleration and speed that turn ON the receiver and or receiver-transceiver when the acceleration, high torque/g-force and or vehicle speed and or inverter to motor electrical speed parameters are met and or exceeded.

When the high-performance vehicle 12 reaches a predetermined vehicle speed such as 100+ mph, the vehicle speed output sensor 18 turns on the wireless receiver 14. The high-performance vehicle 12 is now armed to receive RF messaging packets from a transmitter and/or transceiver 23 to be described. The wireless receiver 14 is turned ON once the predetermined vehicle speed is met and OFF once the vehicle speed is reduced under the predetermined vehicle speed. It should be appreciated that, when the high-performance vehicle 12 meets and or exceeds the predetermined vehicle speed, the wireless receiver 14 is turned ON and the high-performance vehicle 12 is now armed to receive RF messaging packets from the transmitter 23.

In another embodiment, the system 10 may also be used for new manufactured vehicles that are targeted for theft while in the manufacturer holding distribution parking lots and/or dealer lots having internal combustion engines and EVs having electric motors. Vehicles targeted for theft are configured with the same, similar, or different speed receiver and/or receiver-transceiver, but turned ON at the vehicle manufacturer, known as Vehicle Speed Ship Mode (VSSM). Vehicles when leaving the manufacturer are configured to VSSM, whereby the vehicle is only capable of 35 MPH or speed deemed necessary until which time the vehicle is prepped at the dealer, restored to full design intent prior to customer delivery. The method used to implement VSSM is performed using paragraph the same, similar, or different RF receiver and/or receiver-transceiver implemented in high horsepower to weight ratio performance vehicles and/or high torque electric vehicles as previously described, by turning ON the speed bit indefinitely by use of custom factory software and or factory tool. This factory step bypasses the actual vehicle speed electronic inputs, by an input port to the receiver and/or receiver-transceiver to configure vehicle to a slower maximum speed of 35 MPH as an example, at the End of the Manufacturing Line (EOL). Once vehicle is sold, the dealer is able to download software and or a PIN to reconfigure vehicle to its design intent. The implementation of VSSM at the vehicle assembly plant is preferable after hot roll testing or wherever the assembly plant best manufacturing logistics and practices allow. At customer delivery and/or dealer transporting when deemed necessary, a PIN is obtained from the cloud and or a secure data base. An electronic interface box/computer configures the vehicle to a safe configurable transportation speed (dealer to dealer transport) or to full design intent. It should be appreciated that today's vehicles are configured such that certain vehicle option features are not obtainable until the vehicle is prepped for delivery by means of electronic tools and/or PIN's.

In one embodiment, the system 10 also includes a standardized transmitter and/or transmitter-transceiver 23 to be purchased by law enforcement, which is system supplier factory programmed to communicate with standardized wireless speed receivers 14 and/or receiver-transceivers 14 only. The transmitter 23 transmits RF messaging packets to the wireless receiver 14. The transmitter 23 has at least one button 24, or more, and is used by Law Enforcement to transmit the RF messaging packets when the button 24 is pressed to send out RF messaging packets, which communicate with the wireless receiver 14, which then communicates with vehicle speed controller inputs and outputs as previously described.

In one embodiment, the transmitter 23 transmits in a range that meets the distance, power, frequency spectrum, and requirements when transmitting and as required by FCC. In one embodiment, the transmitter 23 has a range up to approximately 1200 ft or as required. In one embodiment, the transmitter 23 may include a battery low sense LED with a possible rechargeable feature. In one embodiment, the transmitter 23 may have press and hold button functions to prevent inadvertent actuation. In one embodiment, the transmitter 23 is back lit, waterproof, drop resistant, low cost, and easy serviceability. It should be appreciated that one standardized and/or preferred mandated first surface design, electronic board design, hardware, and software is used across all vehicle manufacturers so that law enforcement does not have multiple transmitters to select from depending on the vehicle manufacturer while on patrol. It should be appreciated that the transmitter 23 is FCC certified, meets all governmental agency requirements as required. It should also be appreciated that the transmitter 23 can also, if required by design, have an ON/OFF switch.

In one embodiment, the high-performance vehicle 12 that is speeding, will receive the RF messaging packets from the transmitter 23 and reduce the vehicle speed of the high-performance vehicle 12 to a lower predetermined speed such as 65 mph. The reduction in speed to 65 mph allows law enforcement to make a decision to chase the high-performance vehicle 12 at lower safer speeds. To clear the 65-mph speed command control device 20, the high-performance vehicle 12 must see X miles and Y ignition ON/OFF cycles. It should be appreciated that this embodiment allows law enforcement to engage the speeding high-performance vehicle 12.

In another embodiment, the high-performance vehicle 12 that is speeding, will receive the RF messaging packets from the transmitter 23 to reduce the vehicle speed of the high-performance vehicle 12 to a first lower predetermined speed such as 65 mph and then further reduced to a second lower predetermined speed such as 35 mph over a predetermined period of time. The high-performance vehicle 12 cannot exceed a maximum of 35 mph until the speed command control device 20 is cleared. To clear the 65 mph and 35 mph speed command control device 20, the vehicle 12 must see X miles and Y ignition ON/OFF cycles. It should be appreciated that this embodiment allows law enforcement to engage the speeding high-performance vehicle 12. It should also be appreciated that, if the speeding high-performance vehicle 12 is able to rapidly exit a freeway undetected once being hit by the RF messaging packets from the transmitter 23 by law enforcement, enters a residential neighborhood, the neighborhood is further protected from a fleeing vehicle trying to evade the law enforcement now capable of only doing 35 mph.

In yet another embodiment, the high-performance vehicle 12 that is speeding, will receive the RF messaging packets from the transmitter 23 to reduce the vehicle speed of the high-performance vehicle 12 to a first lower predetermined speed such as 65 mph indefinitely. The speed reduction to 65 mph allows law enforcement to make a decision to chase the high-performance vehicle 12 at lower speeds. To clear the speed command control device 20, the high-performance vehicle 12 must be serviced at a dealer.

In still another embodiment, the high-performance vehicle 12 that is speeding, will receive the RF messaging packets from the transmitter 23 to reduce the vehicle speed of the high-performance vehicle 12 to a first lower predetermined speed such as 65 mph and then further reduced to a second lower predetermined speed such as 35 mph over a predetermined period of time. The high-performance vehicle 12 remains in the 35-mph maximum indefinitely. To clear the speed command control device 20, the high-performance vehicle 12 must be serviced at a vehicle dealer.

The high-performance vehicle 12 is driven or towed to a local vehicle dealer to have the speed command control device 20 cleared. The speed command control device 20 is cleared by retrieving a PIN from the Cloud and/or secure data base. When the high-speed vehicle 12 is driven or towed to any vehicle dealer, the vehicle dealer downloads the data from the high-performance vehicle 12 such as the speed and location of the speeding incident from a GPS which is always ON and activated at the time the receiver 14 is activated by vehicle speed of the high-performance vehicle 12. It should be appreciated that the high-performance vehicle 12 is not put back to factory design intent at this time. It should also be appreciated that law enforcement can be notified of the high-performance vehicle 12 at the vehicle dealer if required.

The driver takes the vehicle dealer download and makes a court appearance. The driver pays ticket costs, etc. and returns to the vehicle dealer with proof of ticket paid. The vehicle dealer pulls a secret PIN from the Cloud and/or secure data base and restores the high-performance vehicle 12 back to factory design intent. It should be appreciated that high security PIN's are current retrieved from the Cloud today when programming a new FOB/transmitter to a vehicle.

In a further embodiment, in reducing vehicle speeds through the RF signal, the wireless receiver 14 is turned ON by the speed command control device 20 at a predetermined speed along with the GPS identifying the location of the speeding incident of the high-performance vehicle 12. It should be appreciated that this additional feature allows the municipality on where the speeding incident occurred to collect the court/ticket fines. It should also be appreciated that when the high-performance vehicle 12 is brought to the vehicle dealer, a printout is given to the driver of the location and speed of the speeding incident and this printout is passed on to the driver to appear in court to pay for the speeding incident. It should further be appreciated that once the driver pays his/her ticket charges, the court gives seal of approval, whereby the vehicle dealer puts the high-performance vehicle 12 back to design intent.

In another embodiment, the RF signal with the messaging packets is automatically and/or manually triggered through a Police speed radar gun to send out the RF messaging packets once a high-speed performance vehicle 12 is detected. In this embodiment, the transmitter 23 is integrated or built into the radar gun. In yet another embodiment, the RF transmitter whether a handheld transmitter, integrated into a radar gun or a stationary radar RF transmitting speed device, an authentication process between two devices, police electronic equipment such as a commuter, or trans receiver sends a RF message to the transmitter, for a successful electronic handshake prior to the transmitter being able to transmit RF proprietary messaging packets to a speeding vehicle. In yet another embodiment, the law enforcement officer authenticates the speed transmitter to the vehicle, thus having an ID from which vehicle the transmission is sent from. In yet another embodiment X number of speed enforcement transmitters are programmed to police vehicle(s) when being built, similar to the Vehicle Key transmitter/FOB to vehicle manufacturing process being done today and/or at the law enforcement vehicle retrofit centers. In yet another embodiment, the police vehicle(s) are built with internal transmitter and/or transmitter-transceiver, stationarily mounted to send RF messaging which can be done through a switch on the dash and or a handheld transmitter, transmitting to the vehicle RF speed transmitter and/or transmitter-transceiver. These examples of authentication and or processes will reduce the possibility of transmitter cloning.

Figure 4:
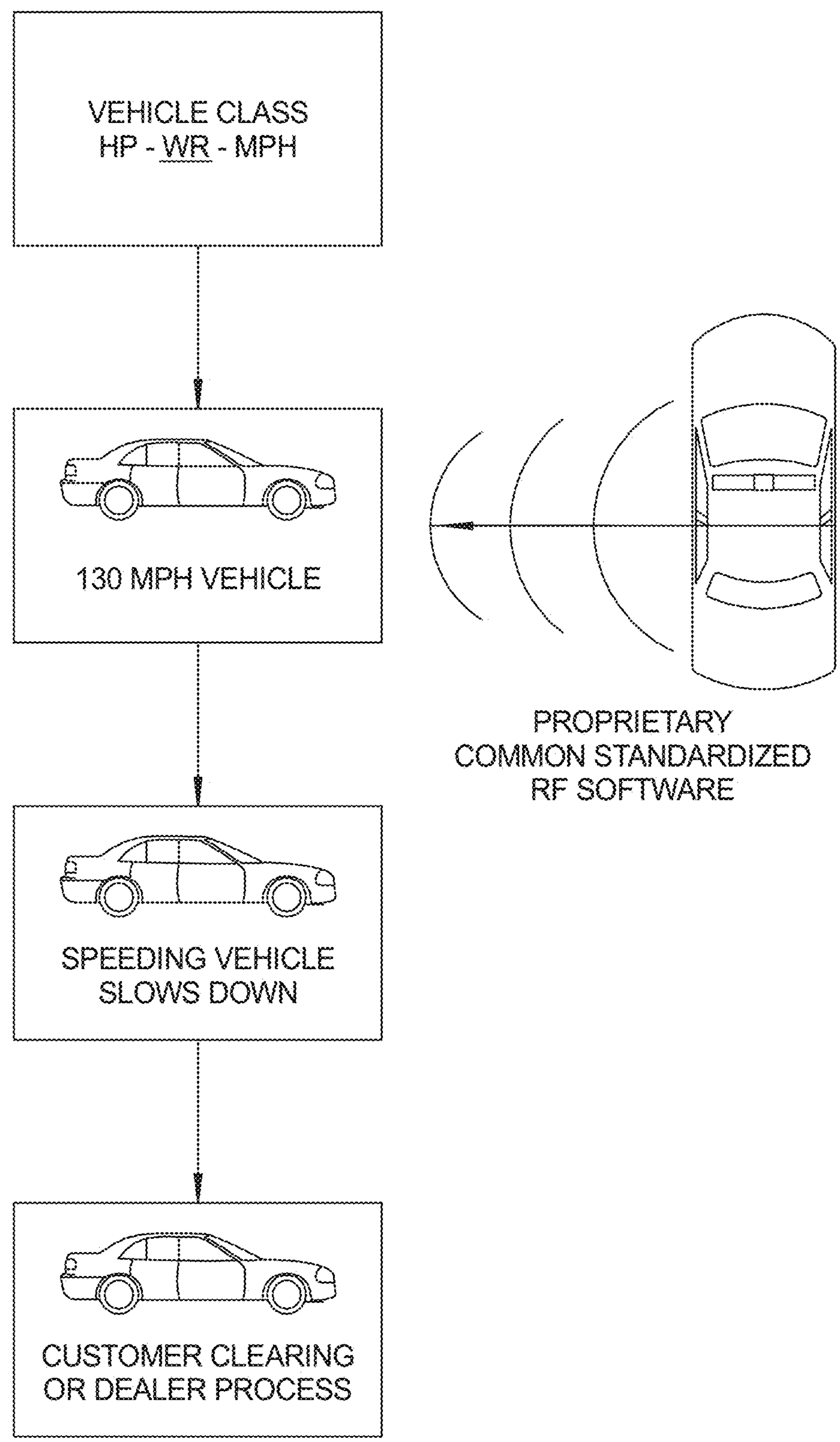
FIG. 4 is a flow diagrammatic view of the operation of the system of FIG. 1 in accordance with an embodiment of the present invention.

Referring to FIG. 4, a flow diagram of a method of operation of the RF speed control system 10 is shown. In operation, when the high-performance vehicle 12 reaches a calibrated and predetermined vehicle speed such as 100+ mph, the speed command control device 20 turns ON the wireless receiver 14. The high-performance vehicle 12 is now armed to receive the RF messaging packets from the transmitter 23 used by law enforcement, which is factory programmed to communicate with the wireless receiver 14. The wireless receiver 14 is turned ON once the vehicle speed of the high-performance vehicle 12 meets the calibrated predetermined speed and OFF once the vehicle speed of the high-performance vehicle 12 is reduced below the calibrated predetermined speed.

When the high-performance vehicle 12 meets or exceeds the calibrated predetermined speed, the wireless receiver 14 is turned ON and the high-performance vehicle 12 is now armed to receive the RF messaging packets from the transmitter 23 when the transmitter button 24 is pressed by a Law Enforcement Officer. The transmitter 23 sends out RF messaging packets which communicate with the wireless receiver 14, which then communicates with vehicle speed controller subsystems on the vehicle 12 as previously described.

In one embodiment, the vehicle speed of the speeding high-performance vehicle 12 is reduced to 65 MPH. In another embodiment, the vehicle speed of the speeding high-performance vehicle 12 is reduced to 65 MPH and then further reduced to 35 mph over X period of time. To clear the speed command control device 20, the high-performance vehicle 12 must see X miles and Y ignition ON/OFF cycles.

The system 10 and method reinstate disciplined driving back on the streets by means of reducing speeds and have accountability on those that drive recklessly. Law enforcement can now enforce tickets to rouge drivers. The system 10 and method reduces property loss and lives. Drivers' rights/freedoms are not infringed on when using a vehicle within the law and a majority of vehicles may or may not be equipped with the system 10. The driver of the high-performance vehicle 12 turns ON the wireless receiver 14 in the system 10 by his/her own choice by engaging in high speeds. It should be appreciated that no human rights are being infringed on, as the driver makes the choice to speed, knowing that if law enforcement is in the area, the driver could be stopped and issued a ticket for speeding or going before the legal court system to have the vehicle configured back to production intent. It should be appreciated that the RF speed control system 10 places all drivers on a level playing field with law enforcement. It should further be appreciated that the system 10 and method creates revenue for the counties/states/vehicle dealers and safer roads, thus reducing injury, lives lost, and/or insurance costs.

The term "transmitter" as used in the present application means "handheld and/or standardized device that transmits RF messaging". The term "transmitter receiver or transceiver" as used in the present application means "transmits and receives RF messaging". The term "receiver" as used in the present application means "receives RF messaging". The term "receiver or transceiver" as used in the present application means "receives and transmits RF messaging".

The present invention has been described in an illustrative manner. It is to be understood that the terminology, which has been used, is intended to be in the nature of words of description rather than of limitation and all parameters are to be used as place holders only.

Many modifications and variations of the present invention are possible in light of the above teachings. Therefore, the present invention may be practiced other than as specifically described.

What is claimed is:

1. A system of Radio-Frequency (RF) speed control for a high-performance vehicle comprising:

one of a wireless receiver and receiver-transceiver integrated into one of a powertrain electrical system, Electronic Control Unit (ECU), Motor Control Unit (MCU), and vehicle speed sensors of the high-performance vehicle;

a speed command control device integrated into the at least one of the wireless receiver and receiver-transceiver to be automatically activated by a driver of the high-performance vehicle driving the high-performance vehicle at a predetermined first vehicle speed to turn ON the one of the wireless receiver and receiver-transceiver and to be automatically deactivated by the driver driving the high-performance vehicle below the predetermined first vehicle speed to turn OFF the one of the wireless receiver and receiver-transceiver; and one of a transmitter and transmitter-transceiver operable by law enforcement to transmit RF messaging packets to the one of the wireless receiver and receiver-transceiver when the speed command control device is activated to reduce a vehicle speed of the high-performance vehicle to a predetermined second vehicle speed being lower than the predetermined first vehicle speed until the speed command control device is cleared by the high-performance vehicle being driven a predetermined number of miles and receiving a predetermined number of ignition ON/OFF cycles or being serviced at a vehicle dealer.

2. The system of claim 1 wherein the one of the wireless receiver and receiver-transceiver is a Radio-Frequency (RF) receiver.

3. The system of claim 2 wherein the RF receiver is turned by the speed command control device ON once the vehicle speed of the high-performance vehicle meets the predetermined first vehicle speed and OFF once the vehicle speed is reduced under the predetermined first vehicle speed.

4. The system of claim 1 wherein the speed command control device is calibrated to the predetermined first vehicle speed.

5. The system of claim 1 wherein the speed command control device is a calibratable software for at least one of the vehicle speed and a motor torque.

6. The system of claim 1 wherein the one of the transmitter and transmitter-transceiver transmits the RF messaging packets.

7. The system of claim 6 wherein the one of the wireless receiver and receiver-transceiver receives the RF messaging packets from the one of the transmitter and transmitter-transceiver when the wireless receiver and/or receiver-transceiver is turned ON to reduce the vehicle speed of the high-performance vehicle.

8. The system of claim 1 wherein the one of the transmitter and transceiver transmits in a range of up to 1200 ft.

9. The system of claim 1 wherein the one of the wireless receiver and transceiver receives the RF messaging packets to reduce the vehicle speed of the high-performance vehicle to the predetermined second vehicle speed and then further reduced to a predetermined third vehicle speed being lower than the predetermined second vehicle speed over a predetermined period of time or the vehicle cannot exceed the predetermined third vehicle speed until the vehicle is serviced at the vehicle dealer.

10. A method of Radio-Frequency (RF) speed control for a high-performance vehicle comprising steps of:

providing one of a wireless receiver and receiver-transceiver integrated into one of a powertrain electrical system, Electronic Control Unit (ECU), Motor Control Unit (MCU), and vehicle speed output sensors of the high-performance vehicle;

automatically turning ON, by activating a speed command control device integrated into the one of the wireless receiver and receiver-transceiver at a predetermined first vehicle speed by a driver of the high-performance vehicle driving the high-performance vehicle, the one of the wireless receiver and receiver-transceiver, and automatically turning OFF the one of the wireless receiver and receiver-transceiver by deactivating the speed command control device by the driver driving the high-performance vehicle below the predetermined first vehicle speed; and transmitting, by one of a transmitter and transmitter-transceiver of law enforcement, RF messaging packets to the one of the wireless receiver and receiver-transceiver when the speed command control device is activated and reducing a vehicle speed of the high-performance vehicle to a predetermined second vehicle speed being lower than the predetermined first vehicle speed until the speed command control device is cleared by the high-performance vehicle being driven a predetermined number of miles and receiving a predetermined number of ignition ON/OFF cycles or the vehicle cannot exceed the predetermined second vehicle speed until the vehicle is serviced at a vehicle dealer.

11. The method as set forth in claim 10 wherein the one of the wireless receiver and receiver-transceiver is a Radio-Frequency (RF) receiver.

12. The method as set forth in claim 11 including a step of turning, by the speed command control device, the RF receiver ON once the vehicle speed of the high-performance vehicle meets the predetermined first vehicle speed and OFF once the vehicle speed is reduced under the predetermined first vehicle speed.

13. The method as set forth in claim 10 including a step of calibrating the speed command control device to the predetermined first vehicle speed.

14. The method as set forth in claim 10 wherein the speed command control device is a calibratable software for at least one of the vehicle speed and a motor torque.

15. The method as set forth in claim 10 including a step of transmitting, by the one of the transmitter and transmitter-transceiver, the RF messaging packets.

16. The method as set forth in claim 15 including a step of receiving, by the one of the wireless receiver and receiver-transceiver, the RF messaging packets from the one of the transmitter and transmitter-transceiver when the one of the wireless receiver and receiver-transceiver is turned ON to reduce the vehicle speed of the high-performance vehicle.

17. The method as set forth in claim 10 wherein the step of transmitting comprises transmitting, by the one of the transmitter and transmitter-transceiver, in a range up to 1200 ft.

18. The method as set forth in claim 10 including a step of receiving, by the one of the wireless receiver and receiver-transceiver, the RF messaging packets to reduce the vehicle speed of the high-performance vehicle to the predetermined second vehicle speed and then further reduced to a predetermined third vehicle speed being lower than the predetermined second vehicle speed over a predetermined period of time.

* * * * *